2,884,394

AQUEOUS SOLUTIONS OF POLYESTER RESINS PREPARED BY REACTION OF A POLYHYDRIC ALCOHOL, A PARTIAL ALLYL ETHER OF PENTAERYTHRITOL, AND AN UNSATURATED DICARBOXYLIC ACID

Raymond P. Silver, Kennett Square, Pa., assignor to Hercules Powder Company, Wilmington, Del., a corporation of Delaware No Drawing. Application August 20, 1956
Serial No. 605,214

5 Claims. (Cl. 260—29.2)

The present invention relates to aqueous solutions of reaction products of a polyhydric alcohol, a partial allyl ether of pentaerythritol, and an $\alpha,\beta$-unsaturated dicarboxylic acid which can be converted to the insoluble and infusible state by the application of heat. It further relates to aqueous solutions of such reaction products. It still further relates to coating and impregnating compositions cotnaining any of the aforesaid solutions.

Reaction products of the type designated above, assuming reaction has taken place to the extent required to give rise to the resinous state, are known to the art as alkyd or polyester resins.

Various attempts have been made by the art to apply alkyd resins via aqueous solutions or dispersions thereof. The advantages of the use of water are substantial. Not only is the expense of organic solvents eliminated; but the use of water makes it possible to apply the resins at high temperatures which would cause a fire hazard in the presence of inflammable organic solvents. Unfortunately, however, the prior art attempts to use water as the solvent or carrier have not been entirely successful.

One device for using water as the carrier has been to first prepare an alkyd resin of rather high acid value and then solubilize the same in water by the use of ammonia, inorganic bases such as NaOH, KOH, etc. as well as water-soluble organic bases such as the ethanolamines. This device has its disadvantages due to the fact that the alkaline solubilizing agents that cannot be volatilized lower the water-resistance of the ultimate film, whereas the volatile alkaline solubilizing agents seriously affect the speed of convertibility of films containing the same.

One answer to the needs of the art is provided by the compositions described in U.S. 2,646,410 to Joseph Wayne Kneisley. The compositions of that patent are aqueous solutions of reaction products of a polyhydric alcohol and an $\alpha,\beta$-unsaturated dicarboxylic acid, which compositions are water-soluble by virtue of a critical selection of reactants and control of the extent of reaction. The compositions of the patent have, among other applications, proved to be excellent binders for glass wool fibers to be used, for example, in the manufacture of insulating batts.

An improvement on the compositions of the aforesaid Kneisley patent is described in copending application Serial No. 558,582, filed January 11, 1956, by Raymond P. Silver. The improved compositions of this patent are prepared by modifying the resinous ingredient of the compositions of the Kneisley patent by the addition of boric acid as a reactant. The compositions of both the Kneisley patent and the copending application have proved to be generally excellent in their intended uses. However, one slight shortcoming has been observed. This is that the compositions in some instances are undesirably slow in curing, i.e., they require a curing time longer than that desired or a curing temperature higher than that desired. Although the cure can be accelerated by the inclusion of catalysts such as peroxides, even this is sometimes not sufficient to give as fast a cure as is desired to meet fast production schedules.

In accordance with the present invention, it has been found that the replacement with a partial allyl ether of pentaerythritol of a portion of a polyhydric alcohol used in preparing compositions of the type above-described results in a modified composition having the ability to cure much more rapidly in the presence of a peroxidic catalyst. Although the reaction products so produced have somewhat less water-dilutability than those of the prior art, this sacrifice is unimportant in many applications. The invention thus relates to aqueous solutions of reaction products of a polyhydric alcohol, a partial allyl ether of pentaerythritol, and an $\alpha,\beta$-unsaturated dicarboxylic acid selected from the group consisting of maleic acid, maleic anhydride, and fumaric acid. In a preferred embodiment the reaction product is modified by the inclusion of boric acid.

In preparing the aqueous solutions of this invention, it is necessary to take into account a number of different factors. These factors relate either to (1) the nature and proportions of the reactants which are employed or (2) the extent of reaction. The products which are employed in forming the aqueous solutions are either in the resinous state at the time of their employment or they are incipient resins. In view of the fact that it is difficult to draw the line of demarcation between such products, they will be referred to hereinafter simply as "reaction products."

More specifically, the reaction products which are used in accordance with the invention are those obtained by partially esterifying ingredients including a polyhydric alcohol, a partial allyl ether of pentaerythritol, and an unsaturated dicarboxylic acid selected from the group consisting of maleic acid, maleic anhydride, and fumaric acid; in the preferred embodiment a portion of the dicarboxylic acid is replaced by boric acid. Although the general description of the invention which follows describes the invention with respect to maleic acid, it will be understood that maleic anhydride or fumaric acid can be employed equivalently therefor. The polyhydric alcohol must be an alcohol having from 2–6 inclusive hydroxyl groups per molecule or mixtures of such alcohols. The polyhydric alcohol furthermore must contain no oxygen except in the form of hydroxyl groups and it must have an OH/C ratio of 0.6:1.0 inclusive. (OH/C ratio as used herein means the ratio of the number of hydroxyl groups to the number of carbon atoms contained in a given compound.)

In preparing the reaction products, the reactants can be used in various proportions. They must, however, be employed in such proportions as to provide a heat-convertible reaction product, i.e., one which when heated in the presence of air at a temperature below its decomposition temperature will become insoluble and infusible.

The useful reaction products, in accordance with this invention, are prepared from reactants which supply at least one hydroxyl group for each acidic hydrogen and which, when reacted, contain sufficient unreacted hydroxyl groups to be dilutable with water to form a solution having a solids concentration at least as low as about 50%. More specifically, the useful reaction products are those prepared from reactants containing from about 1 to 5 hydroxyl groups for each acidic hydrogen and which have an acid number below 150. More preferably, the reaction products are prepared from ingredients containing from about 2.5 to 4 hydroxyl groups for each acidic hydrogen and which have an acid number below about 60. For the purpose of calculating the ratio of hydroxyl groups to acidic hydrogen atoms, maleic anhydride is to be considered as possessing two acidic hydrogen atoms since it possesses two potential carboxyl groups.

A further proviso is that the number of hydroxyl groups supplied by the partial allyl ether of pentaerythritol can range from about 1 to 20%, more preferably from 4 to 10%, of the total number of hydroxyl groups initially present. If the partial allyl ether is used in lesser amount, no noticeable increase in rate of cure is obtained. If used in greater amount, the reaction product becomes progressively less miscible with water.

The important property of the reaction products of the invention lies in their ability in the presence of a peroxidic catalyst to be converted by heat with exceptional speed to the insoluble, infusible state. The cured reaction products also are flexible and are characterized by good color and color stability; they also possess good water resistance.

Having described the generic aspects of this invention, the following examples are given to illustrate specific embodiments. The specific examples are not, however, to be construed as limiting the invention.

*Example 1*

Into a reaction vessel equipped with a thermometer, carbon dioxide sparge tube, stirrer, and steam condenser, there was charged 4.415 parts of ethylene glycol, 21.56 parts of diallyl ether of pentaerythritol, 44.7 parts of commercial pentaerythritol, 22.344 parts of maleic anhydride, 2.348 parts of boric acid, and 18.6 parts of water. (The pentaerythritol used in subsequent examples was a technical grade material having an equivalent weight of 37.) The $OH/H^+$ ratio of this charge was 2.65. The reaction vessel was flushed out with carbon dioxide and the mixture was heated with agitation to a temperature of 170–190° C. After 3 hrs. of reaction, the acid value of the product was 17.4. At this point, the reaction product was cut to 75% solids by the addition of water.

To 100 parts of the 75% solution, there was added 50 parts of a 1.5% aqueous potassium persulfate solution to give a 50% solution of the reaction product catalyzed by 1% of its weight of potassium persulfate.

The cure time of the final solution catalyzed with potassium persulfate was measured by the electric hot plate test. In this test, the surface of a clean, hot plate is maintained at 200° C. and a droplet (about 1/16 inch in diameter of the solution is dropped on the hot plate surface and immediately spread with lengthwise strokes of a nail over an area approximately 2 inches by 1/2 inch. After spreading, the film is stroked lightly with the nail until the resin becomes completely gelled. The time required to achieve this state is noted as the cure time.

The solution of Example 1, when tested by the above method, had a cure time of 0 seconds. A comparative composition without catalyst had a cure time of 15 seconds. For comparative purposes, a 50% solution of a reaction product prepared exactly as in Example 1, except for the omission of the diallyl ether of pentaerythritol and its replacement with an equimolecular quantity of ethylene glycol, had a cure of 21 seconds in the presence of potassium persulfate and a cure time of 25 seconds in the absence of potassium persulfate.

*Example 2*

A reaction product was prepared exactly as in Example 1 except that the quantity of ethylene glycol was increased to 6.82 parts and the quantity of diallyl ether of pentaerythritol reduced to 9.24 parts. Reaction was carried out at 190° C. to an acid number of about 23. The reaction product was diluted to 75% solids with water and 100 parts of the resulting solution was blended with 50 parts of an aqueous 1.5% solution of potassium persulfate. The resulting solution had a cure time of 5 seconds by the hot plate test. In the absence of catalyst a 50% solution of the reaction product had a cure time of 20 seconds.

*Example 3*

A reaction product was prepared according to the procedure of Example 1. The reactants were the same except boric acid was omitted and the amount of maleic anhydride increased by an amount stoichiometrically equivalent to the boric acid. Reaction was carried out at 190° C. until an acid number of 45 was reached.

A 50% aqueous solution of this reaction product catalyzed with 1% potassium persulfate, based on the amount of reaction product, had a cure time of less than 5 seconds by the hot plate test. Without catalyst, it had a cure time of about 20 seconds. A comparative composition containing no allyl ether of pentaerythritol had a cure time of 25 seconds with catalyst and a cure time of 20 seconds without catalyst.

It is apparent from the preceding examples that the compositions of the invention have an exceptionally fast cure time when a peroxidic catalyst is present.

*Example 4*

This example illustrates the utility of the aqueous solutions of the invention as binders for glass wool.

The 50% aqueous solution of Example 1 (catalyzed with 1% potassium persulfate) was sprayed on glass wool fibers in an amount to provide 10% of reaction product based on the glass wool. The white glass wool was then compressed in the form of a batt suitable for insulation and heated to 200° C. to remove water and cure the reaction product. A batt having good mechanical properties was obtained after a cure time of only 1 to 2 minutes.

As previously stated, the reaction products whose aqueous solutions are the subject of this invention are obtained by partially esterifying a polyhydric alcohol, a partial allyl ether of pentaerythritol, and an $\alpha,\beta$-unsaturated dicarboxylic acid selected from the group consisting of maleic acid, maleic anhydride, and fumaric acid.

The partial allyl ether of pentaerythritol is used in an amount to provide from 1 to 20%, more preferably from 4 to 10%, of the number of hydroxyl groups initially present. The partial allyl ether of pentaerythritol can be either a mono-, di-, or tri-ether although the diether is preferred. Such ethers are ordinarily prepared by the reaction of pentaerythritol with an allyl halide in aqueous media. Ordinarily the products of this reaction are mixtures of ethers. It is customary to refer to a mixture of ethers whose average degree of allylation is 2, for example, as a diallyl ether of pentaerythritol. The diallyl ether of pentaerythritol referred to in the preceding examples was in fact a mixture of ethers which mixture had an iodine value of 240 and a hydroxyl value of 11%. Of course it is also possible to employ a pure mono-, di-, or tri-allyl ether of pentaerythritol in place of the mixture of ethers although no advantage is obtained by the use of such pure ethers.

The examples have illustrated the use of various polyhydric alcohols and various mixtures of polyhydric alcohols. However, not all polyhydric alcohols are operable so far as providing the reaction products which are useful in this invention. Thus, it appears that the useful polyhydric alcohols are those having from 2 to 6 inclusive OH groups per molecule or mixtures thereof. The polyhydric alcohol employed must contain no oxygen except in the form of OH groups. Ether alcohols such as the polyethylene glycols are accordingly excluded. As has been previously stated, the OH/C ratio must be in the range of 0.6 to 1.0, inclusive. By virtue of this limitation, alcohols such as hexamethylene glycol, etc. are excluded. Taking all of the aforesaid limitations with respect to the polyhydric alcohols into account it can be seen that alcohols such as ethylene glycol, propylene glycol, glycerol, pentaerythritol, mannitol, sorbitol, etc. or their mixtures may be employed. The term "functionality" as herein applied to alcohols refers exclusively to the number of hydroxyl groups per molecule of the alcohol.

As has been explained previously, the reaction products employed in accordance with this invention must be heat-convertible, i.e., they must be convertible to the insoluble, infusible state when heated in the presence of air at a temperature below the decomposition temperature thereof.

The reaction products of the type here considered can be clasified into two groups:

(a) those which cannot be converted to the insoluble, infusible statae solely by the mechanism of polymerization; and (b) Those which can be converted to the insoluble, infusible state by the mechanism of esterification as well as by a combination of esterification and polymerization of the double bonds. Both types of reaction products, if properly formulated, can be converted to the insoluble, infusible form by the application of heat. Hence, all such reaction products may be said to be heat-convertible. The difference between the two types of products depends on the degree of functionality of hydroxyl-containing components. Thus, those which contain an appreciable quantity of a monoallyl ether of pentaerythritol or of a polyhydric alcohol having more than 2 hydroxyl groups can be converted to the insoluble, infusible state by the method of esterification alone.

With respect to group (b) reaction products, it is preferred to employ such reaction products which are formulated so that they can be converted by esterification alone. Although the reaction products are so designed, the maleic double bonds can also play a part in the conversion, particularly if the conversion is carried out under conditions favorable for this reaction, such as heating in the presence of a peroxidic catalyst. As a result, reaction products so formulated convert much more quickly under milder conditions and yield harder and tougher conversion products due to a greater amount of cross-linking. Reaction products designed so that they may be converted by esterification alone can be formulated within certain limits known to the art.

Turning now to reaction products of the type of the above-described group (a), i.e., reaction products of maleic acid, a dihydric alcohol, and an allyl ether of pentaerythritol, it is well known to the art that reaction products of this general type cannot be converted to the insoluble, infusible stage solely by the mechanism of esterification. The predominant factor in the conversion of such products is polymerization of the ethylenic double bonds of the maleic acid groups contained therein.

Aqueous solutions of reaction products prepared from a mxiture of pentaerythritol and ethylene glycol constitute a preferred embodiment of the invention. They are especially preferred due to the fact that the ultimate cured resins in the form of films, etc. evidence an exceptionally high degree of flexibility. It is still further preferred that these two alcohols be employed in such proportions that there are present from 4.0 to 4.5 chemical equivalents of pentaerythritol per chemical equivalent of ethylene glycol.

In preparing the subject reaction products various reaction temperatures can be employed, and the invention is not to be considered as limited in this respect. The preferred temperatures are from 120°–200° C., with temperatures from 170°–190° C. being most preferred. When one of the reactants is liquid at normal temperatures, the simplest procedure is to make a dispersion of the solid ingredients in the liquid and apply heat to this dispersion, as, for example, in the case of glycerol, maleic anhydride, and the allyl ether of pentaerythritol. Where none of the reactants is liquid at normal temperatures, sufficient water can be added to provide a fluid slurry. This technique is illustrated by Example 1.

The aqueous solutions of this invention will contain a substantial amount of water, i.e., at least sufficient water to provide a composition that is liquid. Aqueous solutions having a reaction product concentration of from about 10 to 85% have been found useful for most of the intended applications.

The aqueous solutions of this invention can be used per se as coating, impregnating, sizing, or bonding compositions. However, they may also be used in conjunction with other water-soluble film-formers as, for example, water-soluble glues such as animal glue, fish glue, etc., water-soluble cellulose derivatives such as sodium carboxymethylcellulose, methyl cellulose, etc., water-soluble gums such as gum arabic, tragacanth, etc., etc. Additional possible components include water-soluble dyes and water-dispersible pigments.

By varying the ratio of the number of hydroxyl to the number of carboxyl groups in the initial formulation not only the water-solubility and dilutability of the resins or incipient resins used in this invention can be altered, but also the speed and ease with which the resins are heat-converted to the insoluble, infusible state can be varied.

Although the compositions of the invention can be heat-converted without the presence of a peroxidic catalyst, their outstanding attribute is the ability to cure with exceptional speed in the presence of such a catalyst. To obtain this advantage it is particularly convenient to employ a water-soluble peroxidic catalyst such as potassium persulfate or urea peroxide. However, any peroxidic catalyst can be used as, for example, benzoyl peroxide, lauroyl peroxide, cumene hydroperoxide, acetyl peroxide, tertiary butyl hydroperoxide, tertiary butyl perbenzoate, and the like.

The compositions of this invention are useful as binders for glass wool fibers and many other types of fibrous and particulate material. Dilute aqueous solutions of the desired reaction product (resin) and other components are applied to the base material. The resin is subsequently heat-converted to an insoluble, infusible water-resistant state, this application taking advantage of several properties of the subject aqueous solutions. In view of the fact that they can be diluted with water they may be easily applied by spray application. The cost is low due to the fact that expensive solvents are not required. The cured reaction product imparts good water resistance and strength to the finished products.

Among other uses of the subject aqueous solutions the following may be mentioned. They may be used as sizing materials for glass cloth and yarn to prevent fraying. They may also be used as binders for abrasives. Another use lies in the manufacture of plywood and other laminated structures. These aqueous solutions may also be used in the manufacture of brake linings in which use the ultimate resin functions as a binder.

All parts and percentages in the specification and claims are by weight unless otherwise indicated.

What I claim and desire to protect by Letters Patent is:

1. A composition suitable for coating and impregnating applications comprising an aqueous solution of a heat-convertible esterification product of ingredients consisting essentially of a polyhydric alcohol, a partial allyl ether of pentaerythritol, and an unsaturated organic compound selected from the group consisting of maleic acid, maleic anhydride, and fumaric acid, said polyhydric alcohol being selected from the class consisting of polyhydric alcohols of from 2 to 6 hydroxyl groups per molecule and mixtures thereof, said polyhydric alcohol containing no functional groups other than hydroxyl groups and containing no oxygen except in the form of hydroxyl groups and having an OH/C numerical ratio of from 0.6 to 1.0, said ingredients providing from 1 to 5 alcoholic hydroxyl groups for each acidic hydrogen, said partial allyl ether of pentaerythritol providing from about 1 to 20% of the total alcoholic hydroxyl groups and said reaction product having an acid number below 150 and being dilutable with water to a solids concentration at least as low as about 50%.

2. The composition of claim 1 wherein the partial allyl ether of pentaerythritol is a mixture of ethers averaging approximately two allyl groups per molecule.

3. The composition of claim 1 wherein pentaerythritol is employed as the polyhydric alcohol.

4. The composition of claim 3 wherein maleic anhydride is employed as the unsaturated organic compound.

5. An aqueous solution of an esterification product of ethylene glycol, pentaerythritol, an allyl ether of pentaerythritol averaging approximately two allyl groups per molecule, and maleic anhydride, the proportion of reactants being such that there is provided from 1 to 5 alcoholic hydroxyl groups for each acidic hydrogen and such that said allyl ether of pentaerythritol supplies from about 1 to 20% of the total number of alcoholic hydroxyl groups and said reaction product having an acid number below about 150 and being dilutable with water to a solids concentration of at least about as low as 50%.

References Cited in the file of this patent

UNITED STATES PATENTS

| | | |
|---|---|---|
| 2,399,214 | Evans | Apr. 30, 1946 |
| 2,496,234 | Robie | Jan. 31, 1950 |
| 2,585,035 | Roach et al. | Feb. 12, 1952 |
| 2,606,883 | Hoover | Aug. 12, 1952 |
| 2,646,410 | Kneisley | July 21, 1953 |